SELF-NEUTRALIZING MANUAL OVERRIDE CLUTCH

Original Filed Feb. 6, 1967

INVENTOR
GIOVAN B. CANDELA
BY Whittemore, Hulbert & Belknap
ATTORNEYS

SELF-NEUTRALIZING MANUAL OVERRIDE CLUTCH

Original Filed Feb. 6, 1967

INVENTOR.
GIOVAN B. CANDELA

BY Whittemore, Hulbert & Belknap

ATTORNEYS

United States Patent Office

Re. 26,558
Reissued Mar. 25, 1969

26,558
SELF-NEUTRALIZING MANUAL OVERRIDE CLUTCH

Giovan B. Candela, East Detroit, Mich., assignor to The Formsprag Company, Warren, Mich., a corporation of Michigan Original No. 3,335,832, dated Aug. 15, 1967, Ser. No. 614,340, Feb. 6, 1967. Application for reissue Feb. 23, 1968, Ser. No. 709,506
Int. Cl. F16d *47/00, 67/00, 15/00*
U.S. Cl. 192—48.3 17 Claims

Matter enclosed in heavy brackets [ ] appears in the original patent but forms no part of this reissue specification; matter printed in italics indicates the additions made by reissue.

ABSTRACT OF THE DISCLOSURE

A device including a first rotatable servo input or driver member, a second rotatable manual override input or driver member and a rotatable output or driven member, disposed coaxially, and provision for a selective drive of the output member from one of the input members to the exclusion of the other input member. Such provisions include a force transmitting element, in the form of a sprag or equivalent, which is controlled by an operating element on the manual override input member in such a way as to interrupt a normal line of force transmission from the servo input member to the output member, and establish a line of force transmission from the manual input member to the output member when the servo transmission line is interrupted. Actually, there are a plurality of oppositely oriented sets of such sprags, affording selective servo and manual override drive connections to the output member in either direction of rotation. An automatically acting, self-neutralizing feature restores the manual override input member to a neutral, non-driving position when manual override effort is terminated and servo drive is to be resumed.

The present application is a continuation-in-part of my co-pending application, Ser. No. 555,935, filed June 3, 1966, now abandoned, which in turn is a continuation of a co-pending application, Ser. No. 431,589, filed Feb. 10, 1965, now abandoned.

CROSS-REFERENCE TO RELATED APPLICATIONS

The improvement contemplates a device or system in which the power transmitting clutch means, in addition to being of a sprag type, may also be of a brake drum and shoe type, such as is illustrated and described in the co-pending applications of Ilmars Kalns Ser. No. 503,381, filed Oct. 23, 1965, *now Letters Patents No. 3,335,831 of Aug. 15, 1967*, and Ser. No. 605,872, filed Dec. 29, 1966.

BACKGROUND OF THE INVENTION (1) Field of the invention.—The present invention relates to an improved manual override clutch for use, typically, in association with a plurality of identical clutches in the control of the throttles of a multiple engine aircraft. More particularly, the clutch of the invention is an irreversibel type permitting a selective drive from a driver to a driven or output member in either rotative direction, but blocking a reverse drive from the driven to the driver member.

In a typical installation, a number of individually similar control units or modules, one for each of a number of operated members, such as aircraft engine throttles, have provisions for the selective operation of the individual modules in such a way that the pilot of the craft may effect a selective control adjustment of any one or more of the throttles, to the exclusion of the remainder.

The latter remain in positions of adjustment variably maintained automatically, for example, by the conventional servo mechanism of an automatic pilot system. The arrangement is such that the pilot may, by interposing a slight manual adjusting motion of an instrument panel lever for any given throttle control, automatically decouple the second or autopilot servo control from the throttle connection in question, in effect overriding the latter; and when the desired adjustment is made, cessation of the manual adjustment results in the automatic servo mechanism returning into control thereafter of the adjusted throttle and others.

(2) Description of the prior art.—A typical sort of aircraft installation in which the present improvement may be incorporated is illustrated and described in U.S. Letters Patent to Greene, No. 2,881,635 of Apr. 14, 1959. This shows an arrangement of modules, including individual manual override input units associated with a common servo input unit for the selective drive of individual output members from any one or all of the manual input members, as an option to the drive of the output members by the servo means. The patent to Horstmann 2,394,384 of Feb. 5, 1946 shows an individual dual control system of the type employed in the Greene patent.

The patent to Lund 3,102,618 of Sept. 3, 1963, discloses a two-directional torque coupling and clutch mechanism which is of a sprag type generally similar to the clutch structure, per se, herein illustrated and described.

SUMMARY OF THE INVENTION

The present invention provides an irreversible clutch for the purpose in question, also well suited for other non-aircraft installations which will suggest themselves to those skilled in the art, which is extremely compact in its axial dimension, its overall radius greatly exceeding this dimension, so as to enable the clutch to be assembled in coaxial gang or tandem with other identical clutches in a very small space indeed, such as is available in an aircraft console or instrument panel mounting.

More specifically, the clutch features an output *or driven* member in the form of a relatively flat, disc-like pulley having an inner race member coaxially secured thereto and providing a radially outwardly facing socketed race surface; a [primary] *manual* input control *and driver* member in the form of a disc-like pulley, closely associated axial-wise width the output pulley, and providing a plurality of opposing control *or operating* elements or fingers in fixed relation to the [primary] *first named* pulley, which acts as a [primary], manually operated override pulley; a *further* [secondary] input disc which is in closely associated and axially telescoped relation to the manual override pulley, the secondary input member being driven by an automatic servo mechanism and providing a smooth outer cylindrically race radially inwardly facing the socketed race of the ouput member or pulley; and a plurality of pairs or sets of opposite oriented sprags which are radially inwardly socketed upon tbe output pulley race and are adapted for releasable wedging engagement with the outer race provided on the automatic servo input disc referred to above.

In a preferred adaptation of the invention, and for the desired axial compactness of the clutch as a whole, the output and manual override input members or pulleys are axially thin and nested with one another in close side-by-side relation; and the automatic servo driver or input disc is of minimum width consistent strength, being axially telescoped in a recess of the manual overdrive input pulley. This reduces the ratio of axial dimension to overall radial or diametral dimension to the desired extent. The several servo driver discs are all mechanically but releasably clutch coupled as a unit to the respective several engine throttles.

As the components of each of the improved clutches are thus associated, the automatic servo control mechanism provides operating connections through the coupled servo-drivers to the multiple throttles, to adjust the latter as a group in the desired fashion, there being in each case an irreversible control rotation in either direction from the automatic servo driver through its wedged outer race connection to corresponding, similarly oriented sprags of the several sets of the clutch, then through the socketed inner seats of those sprags to the inner race of the output pulley and to the respective engine throttles. On the other hand, a manual override adjustment of any one or more of the *manually controlled* [primary] pulleys causes correspondingly oriented sprags of the sets in question to be first shifted out of wedging engagement with the outer race, one set of fingers of the manual overdrive member or pulley being responsible for this, whereupon further movement of the same fingers automatically engages the latter with the thus shifted or tilted sprags at the socketed base portions thereof, so that the inner socketed race secured to the output member or pulley is directly driven by the manual override *drive* member or pulley. Under this condition, the oppositely oriented sprags of the sets simply slide along the race surface of the servo input driver member or disc, the latter having been de-clutched from the output member or pulley by the tilting of the first named sprags.

A further feature of importance in the present invention resides in the provision, in association with the selectively operable servo input and manual override drive systems, of an automatically acting self-neutralizing *control device or* unit for the latter. This unit automatically and instantaneously comes into play upon cessation of the action of the override input mechanism, restoring the drive and control fingers of the latter to an intermediate, neutral position in relation to the sprag set, so that instantaneous resumption of the normal servo drive torque, in either direction, is the result.

BRIEF DESCRIPTION OF THE DRAWING

FIG. 5 is a graph plotting the operational characteristics, as to manual input and output resistive torque, in reference to the self-neutralizing operation referred to.

DESCRIPTION OF A PREFERRED EMBODIMENT

Figure 1:
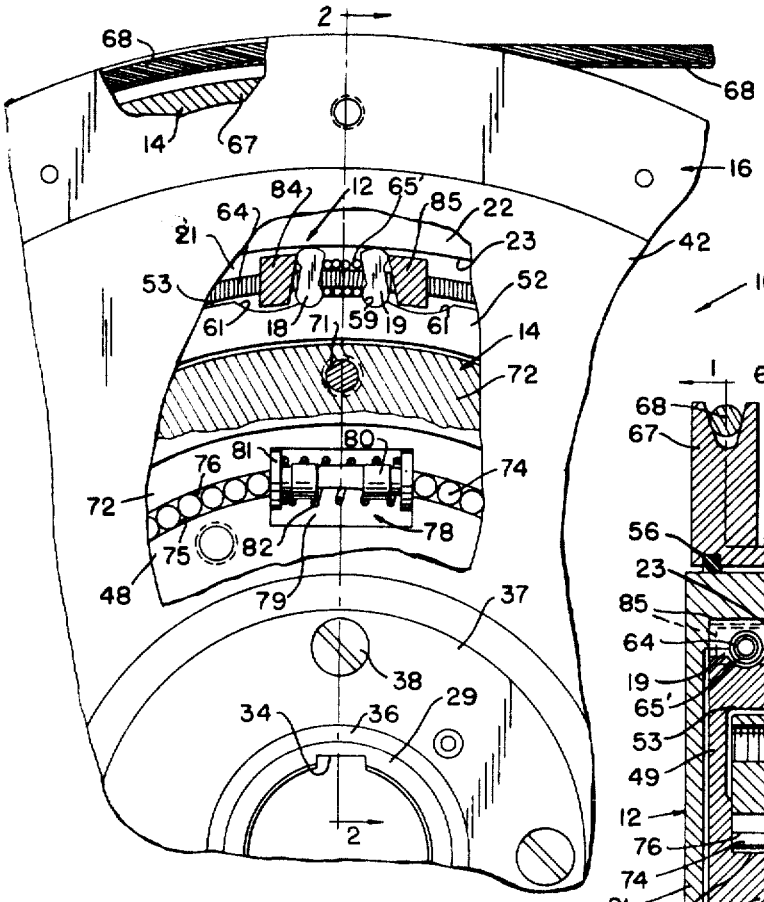
FIG. 1 is a fragmentary, enlarged scale view in end or axial elevation of the improved manual override-servo clutch, being partially broken away and in section transverse of the clutch axis along broken line 1—1 of FIG. 2.

While the improved clutch of the invention, generally designated by the reference numeral 10, has been primarily designed for utilization, as indicated above, as one of a series of identical, ganged or tandemed clutches for the selective operation of multiple aircraft engine throttles, those skilled in the art will perceive its applicability to other related multiple control operations in the aircraft or other fields, also the fact that in lieu of an automatic, servo type of control, the normal, manually overriding driver may be of a different character and, indeed, may itself be manually operable.

The clutch 10 comprises four basic components. These are an automatic servo input drive disc unit 12, which may be considered to be a secondary input member, in view of the fact that the master control unit (to be described) will be designated as a primary control unit, in consonance with the terminology adopted in the above identified Greene Patent No. 2,881,635; the primary or master, manually overriding control unit 14, which is shown as a two-element, pulley and driver unit, although it might well be of one part construction; an output pulley or driven unit 16, also depicted as constituted by two pulley and race components, although it could be integral in construction; and a number of pairs or sets of oppositely oriented *force transmitting elements or* sprags, the sprags of each set being designated 18 and 19, respectively (FIG. 1), for coaction in the general manner of the Lund patent, with and between a socketed, outwardly facing inner race on the output unit 16 and a cylindrical, radially inwardly facing outer race on the servo or secondary input disc unit 12.

Figure 2:
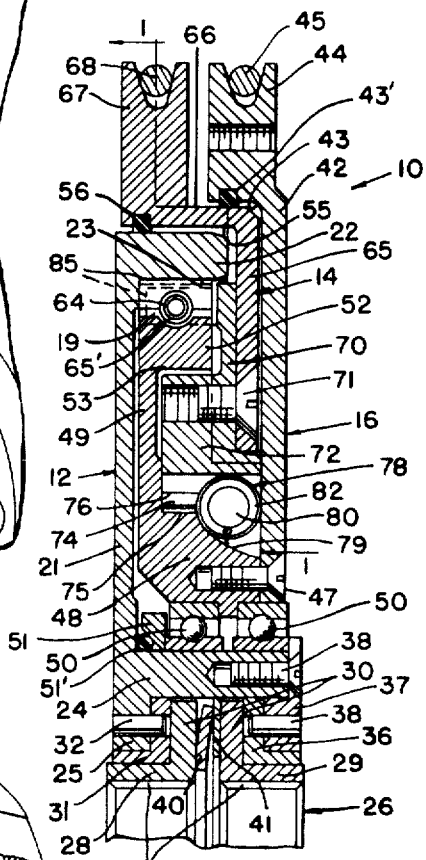
FIG. 2 is a fragmentary view in axial section along line 2—2 of FIG. 1.

The normal servo drive input unit 12, or equivalent unit adapted to be subjected, with like units of other clutches, to overriding action from a manually operated device, is constituted by *a first drive member in the form of* an annular disc 21 of cylindrical outline and relatively large radius as compared with its axial dimension, as shown in FIG. 2. Disc 21 is integrally provided about its outer periphery with an axially extending annular flange or rim 22 of substantial radial thickness, on the radially inner surface of which a cylindrical outer driving race surface 23 is machined. Disc 21 also has a tubular, axially extending hub 24 of axial length approximately co-extensive with that of clutch 10; and a radially extending inner annular flange or shoulder 25 is integrally formed on hub 24. These hub and flange provisions are utilized in mounting the normal driver disc 21 to an inner driving sub-assembly which is generally designated by the reference numeral 26.

Sub-assembly 26 comprises a pair of identical, but oppositely disposed drive rings 28 and 29 of L-shaped cross section, each including a radially outwardly extending annular flange 30. A friction ring 31 is snugly nested about the hub flange 25 of disc 21, being drivingly connected to the flange by a plurality of pins or dowels 32. In the alternative, ring 31 might be sintered or cemented in place.

The drive rings 28 and 29 are provided with axially aligned, internal keyways 34 adapted to receive the driving key or spline provision of a servo drive or other normal input power source (not shown), or a similar normal input drive member equivalent to the secondary driver which powers the disc 21 of the secondary input unit 12.

The right-hand drive ring 29 (FIG. 2) has a friction ring 36 of L-shaped section nested about its own L-shaped outline; and an annular clamp ring or disc 37 is secured by a plurality of bolts or screws 38 to the outer axial end of the disc hub 24. Ring 37, which could also be sintered or cemented in place, holds the friction disc 36 against rotation through the agency of a plurality of pins or dowels 38, just as the pins 32 hold the opposite friction ring 31 against rotation relative to other input disc 21.

An annular Belleville spring 40 is disposed between the radial flange 30 of the drive rings 28 and 29, this spring acting axially against a wear washer 41 abutting the ring 29. Thus, dual frictional drive action, for increased torque capacity, is afforded by the duplicate drive rings 28, 29, with provision for rotative slip under excessive torque at the frictionally engaging surfaces of drive rings 28, 29 with friction rings 31, 36, respectively.

Now considering the output unit 16, it comprises a sheave or pulley ring 42 of diameter substantially greater than that of secondary input unit 12, but very compact in the axial dimension. The axially inner side of pulley member 42 is substantially counterbored cylindrically and quite deeply at 43, being provided with a sealing ring 43' which bears on a telescoped portion of the manual input unit, to be further described. The outer peripheral sheave portion 44 of pulley 42 typically receives a cable 45, which is adapted to be appropriately connected to one of the engine throttles (not shown) or other controlled instrumentality. Cable 45 is fixedly connected to pulley part 44.

The output pulley 42 is fixedly connected adjacent its inner periphery, as by a plurality of attaching screws 47, with the central hub portion 48 of the second component of output unit 16, namely, an annular inner race member 49. This member, and the pulley member 42 are journaled by a pair of ball bearings 50 upon the hub 24 of secondary input disc 21. A pressure ring 51 urges a compressible packing 51' against hub 24 and the radial wall of disc 21.

The inner race member 49 is provided with an axially thickened outer peripheral portion 52, which is formed to provide an inner, radially outwardly facing race surface 53; and the peripheral portion 52 is mated within the outer race surface 23 of secondary input unit 12, with the race surfaces 23 and 53 in radially spaced and opposed relation to one another. Referring to FIG. 2, the annular rim or flange 22 of the disc 21 of unit 12 is nested well within a large and deep cylindrical counterbore 55 of the primary, manual override input unit 14 (to be later described), in promotion of the desired axial compactness; and an annular sealing ring 56 externally seals the units 12 and 14, at rim 22 of the former, against entry of foreign matter and loss of lubricant. The relatively deep mating or nesting of the pulleys 42 and 65 and the secondary input flange 22 at the zones of sealing rings 43' and 56 affords a desirable labyrinth sealing effect.

Referring to FIGS. 1 and 2, the inner race surface 53 is externally shaped in the same general fashion as that of the Lund patent described above. That is, it has pairs, typically four in number equally spaced about the perimeter of the race-carrying enlargement 52, of approximately semi-cylindrical socket 58, 59, which sockets are in circumferentially spaced relation to one another and pivotally or tiltingly receive generally semi-cylindrical inner ends 60 of the sprags 18, 19, respectively. On either side of each pair of sockets, the otherwise cylindrical outer race surface 53 is mildly relieved at 61 to accommodate certain driver elements, to be described.

The sprags 18, 19 of each pair have outer arcuate wedging surfaces 63 adapted for releasable wedging engagement with the cylindrical race surfaces 23 of the secondary driver disc 21; and an annular coiled garter spring 64 extends through central openings in the sprags of all four sets, acting on the sprags in a manner to bias the latter for engagement with the outer race surface 23. That is, as viewed in FIGS. 1 and 3, the left-hand sprag 18 is biased for counterclockwise pivotal or tilting action in its socket 58, while the right-hand sprag 19 is biased clockwise in its socket 59. By preference, secondary coil compression springs 65' act between each pair of sprags 18, 19 to obtain additional energizing action.

The manually operated override driver unit 14 comprises a *second drive member in the form of a* pulley or sheave disc 65, the left-hand side (FIG. 2) of which is counterbored at 55 to receive *the first drive member of* input disc 21; and pulley 65 has a cylindrical inner shoulder 66 which mates within the counterbore 43 of output disc 42, being sealingly engaged by ring 43'. The outer annular groved portion 67 of pulley disc 65 receives a second flexible cable 68, which is appropriately connected to one of the several control levers or the like (not shown) at the pilot's instrument panel or console. Cable 68 is fixed to pulley portion 67.

The pulley element 65 of the primary input unit 14 is fixedly connected adjacent its inner periphery, to the second member 70 of that unit, as by an annular series of bolts or screws 71 taking into an enlarged hub portion 72 of member 70. As best shown in FIGS. 1 and 2, the hub 72 is journaled on the hub 48 of the member 49 of output unit 16 by an almost full circumferential series of needle bearings 74 interposed between axially facing races 75, 76 of the respective hubs.

As best shown in FIG. 1, the hubs 48 and 72 are provided with circumferential relief at a zone 79 to accommodate a needle bearing retainer *and neutralizer* unit 78; and the latter comprises a pair of plugs 80 having enlarged end faces 81 which act oppositly in the circumferential direction to maintain the needle bearing 74 in a slightly less than 360° array between the races 75, 76. A coil compression spring 82 acts betwen the plug elements 80 to urge them oppositly. While the unit *control device or* 78 acts to retain the bearings 74, its primary function is to return the operating fingers or elements 84, 85 to the neutral position of FIG. 1 after overriding action, as will be described.

Figure 3:
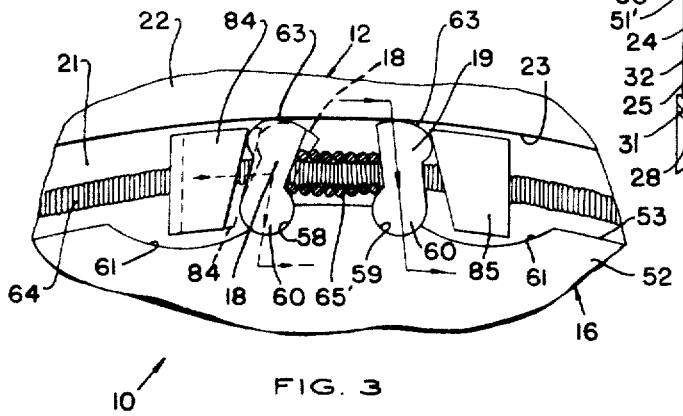
FIG. 3 is a fragmentary end elevation similar to FIG. 1, but in still larger scale to better illustrate the mode of functioning of the clutch in both its normal, automatic pilot servo phase and its manual override phase.

The member 70 of the primary or manual input unit 14 is provided adjacent its outer periphery with sets or pairs (four in number) of control and driving fingers *or operating elements* 84, 85 formed integral with the member 70. As illustrated in FIGS. 1 and 3, these fingers project axially from member 70 on the opposite circumferential sides of each set of sprags 18, 19. Thus, upon rotation of the member 70 in the clockwise direction, the finger 84 of each pair will engage a sprag 18 adjacent its outer radial end and tilt the same out of normal wedging or sliding engagement with the outer race surface 23 of secondary input unit 12; while a counterclockwise rotation of member 70 will tilt the other sprag 19 similarly out of engagement with race 23.

The operation of the clutch 10 is best illustrated in FIG. 3 of the drawings, reference being also had to FIG. 2. In a normal driving condition, as under autopilot servo control, the secondary input unit 12 is in charge. As *its driver member 21 is* rotated clockwise, for example, the line of torque transmission is shown by the series of solid line arrows in FIG. 3, i.e., from the race surface 23 of its cylindrical flange 22 through the wedged right-hand sprag 19, thence through the latter at its seat in socket 59 of the inner race 53 of the member 49 of output unit 16 and the pulley member 42 of the latter. This drives the output cable 45 for an adjusting movement of an engine throttle or other control member, and corresponding members are simultaneously and similarly controlled through corresponding lines of force at other clutches 10 of a multiple installation.

However, reference again being had to FIG. 3, when the operator or pilot wishes to manually override the automatic control source, he operates, by lever or otherwise, the cable 68 associated with one or more of the clutches. This results in a shift of the control fingers 84 or 85 of the driving member 70 of primary manual override unit 14, to the pulley member of which the member 14 is fixedly connected.

Assuming that the operator has made an adjustment which will cause the clockwise movement of the left-hand control and drive finger 84 (FIG. 3) relative to the previously driving outer race member 22, the result is to tilt the left-hand sprag 18 clockwise in its socket 58. This *almost* [almsot] instantaneously brings the wedging surface 63 of that sprag out of wedging engagement with the outer race surface 23, and de-couples the secondary drive unit 12 from the sprag set at sprag 19. A slight further and continued clockwise movement of finger 84 to the dotted line position of FIG. 3 causes the latter to contact the sprag 18 at its cylindrical base portion 60, thus driving the inner race member 49 through the sockets 58 of the latter. The line of force is indicated by the dotted line series of arrows appearing in FIG. 3, and the right-hand sprag 19 simply slides within secondary driver race surafce 23 as the adjustment continues to its conclusion. Should the adjustment be such as to cause a counterclockwise motion of the right-hand control and driver finger 85 relative to inner race member 49, an opposite action will be exerted on the right-hand sprag 19 of each set. Under manual override control, the pulley 42 affixed to inner race member 49 transmits adjusting motion through output cable 45 to the throttle or other control element; and when the adjustment is completed, the secondary servo unit 12 takes over to continue automatic adjustment of such engines or other control members as a group.

As indicated above, the main purpose of the spring unit 78, over and above its confinement of the bearing elements 74, is to centralize the position of the manual input control fingers 84, 85 with respect to the set of sprags 18, 19 socketed at 58, 59 in the output unit 16, so that the servo input unit 12 will always be able to drive the last named unit through the spags at its race, in either direction and at any time. Accordingly, unit 78 is hereinafter referred to as a neutralizing unit.

Figure 4:
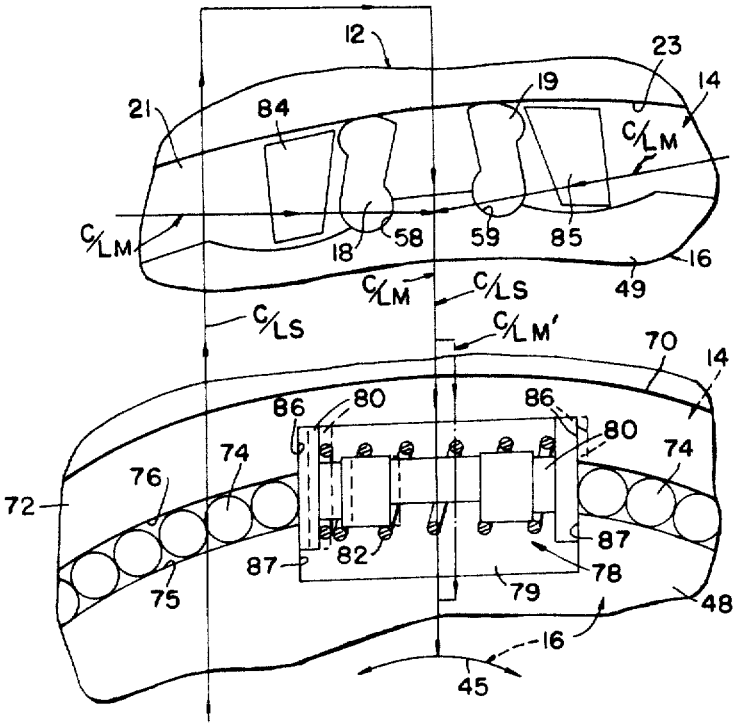
FIG. 4 is a fragmentary schematic view consolidating portions of the structure appearing in FIGS. 1 and 3 for the purpose of indicating lines of servo and manual override force, in connection with the operation of the neutralizing unit referred to, on the understanding that the normal relationship of sprags and driving and control fingers is exaggerated.

Reference being had to FIG. 4 of the drawings, the opposite end plugs 80 of the resilient unit bear against shoulders 86 and 87 on the hub 72 of pulley 71 of manual override input unit 70, and on the hub 48 of race member 49 of output unit 16, respectively. These shoulders circumferentially face the space 79 which receives neutralizing unit 78.

The torque exerted by the unit *78* [18] in its installed position and as thus acting between units 14 and 16, is at least as great as the total resistive drag of the complete manual input system. That is, when the manual input unit 14 is rotated clockwise, as viewed in FIGS. 1 and 4, its control and drive fingers 84 first contact the top of the lefthand sprags 18 (assuming for the sake of discussion an exaggerated operating clearance appearing in FIG. 4), thereby disengaging them from the race surface 23 of disc 21 of servo unit 12. They then continue to heel the sprags 18 over until the fingers 84 drive the output unit 16 in the same direction, acting through the bottoms of the sprags and on the race member 49 of unit 16 at the sockets 58 of the latter.

*The operating clearance mentioned above is very small, sufficient only to neutralize the fingers and force transmitting or sprag elements in slightly spaced relation to one another so that they are out of direct force transmitting or receiving engagement in the direction of force transmission. However, this clearance is significantly important for the reason that even after slight wear of the sprag, under sliding engagement with race surface 23, it must nevertheless maintain engagement with that surface, as energized by spring 65' during the servo phase of operation of the mechanism. Hence, if the sprag directly engaged a finger 84 or 85 in this phase, it might well lose proper clutching engagement with the race surface during the servo-drive phase, thus disabling it for conjoint operation with the remaining sprag. The unit 78, in neutralizing the operator independently of energizing spring 65' minimizes the wear on force transmitters 18 and 19 due to the effort of spring. It also masks the free play between operating element and force transmitting element which would in the absence of neutralizer be quite evident.*

When the power to the manual override input unit 14 is removed, the resultant torque from the resilient neutralizing unit 78 will rotate the manual override input unit 14, and the complete input system, counterclockwise until each control and drive finger pair or set 84, 85 is centered on the same centerline C/LM as a sprag set 18, 19 of the output unit 16.

That is, whereas FIG. 4 schematically shows a centerline C/LM of an override finger set as coinciding, in the normal servo-driving phase, with the centerline C/LS of the servo input, the manual override centerline is shifted to the right in the override input phase, as indicated in dot-dash lines and designated C/LM' in FIG. 4; and it is from this offset position (temporary or not) that the override centerline is restored by neutralizing unit 78 to its normal coincidence with CL/S when override input disappears.

Figure 5:
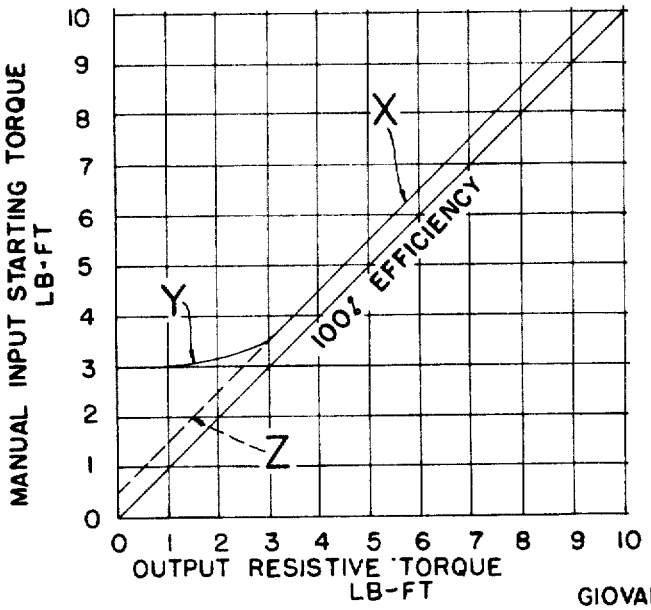

Because of the above functional requirement and effects the manual input torque characteristic appears as shown in the graph of FIG. 5, which plots manual input starting torque against output resistive torque. The curve has a constant slope at a portion X thereof when the output resistive torque is 3 pound-feet or greater. However, from an output resistive torque of less than 3 pound-feet the slope of the curve is constantly changing at a portion Y. This variable slope is due to the resultant resistive torque encountered in initially compressing and deflecting the neutralizing spring unit 78, and thereby ultimately causing an aiding or overhauling torque effort to be imposed on the sprags. The greater the neutralizing spring force, the greater is the manual input starting torque at zero output resistive torque, and vice versa.

Therefore, as the output resistive torque is increased the less will be the reaction torque on the sprags as the resultant from the deflection of the neutralizing spring unit 78. This relationship will continue until the output resistive torque is equivalent to the neutralizing spring torque when the manual input means (control fingers 84 or 85) are just releasing the sprags from the servo input unit 12 at its race surface 23. When the sprags are thus released, the manual input torque required, regardless of the amount of the output resistive torque, will only be enough to overcome the constant internal resistance or drag of the manual override clutch sub-assembly itself.

If the neutralizing spring unit 78 were removed, the slope of the curve of FIG. 5 would be constant, including a lowermost resistive torque portion Z continuing unchanged into the portion X. That is, regardless of the amount of the output resistive torque, the manual input starting torque would always be about 0.5 pound-feet greater than the output resistive torque, and to that extent greater than the values derived from a theoretical constant slope curve of 100% efficiency appearing in FIG. 5. This differential 0.5 pound-feet of torque is the internal resistance or drag of the manual override clutch assembly itself.

The clutch 10, in addition to its highly desired compactness for ganged installation, affords all of the well known advantages of sprag clutch structures in point of instantaneous response without backlash, ruggedness, and the like.

What is claimed is:

[1. In a device of the type described, a first rotatable driver member, a second rotatable driver member, and a rotatable driven member, said members having means providing a rotative drive of the driven member selectively from one or the other of said driver members, said means comprising an operating element operatively connected to one of said driver members, a force-transmitting element adapted to be actuated by said operating element, said force-transmitting element being disposed to transmit force between said first driver member and said driven member, and being actuable by said operating element to interrupt said force transmission and free said driven member for driving rotation by said second driver member, said first named means including means to transmit rotative driving force from said second driver member to said driven member, as thus freed, and means to condition said force transmitting element for a resumed transmission of force between said first driver member and said driven member upon termination of transmission of driving force to the latter from said second driver member.]

[2. The device of claim 1, in which said conditioning means comprises a neutralizing unit acting to resist relative rotation of said second driver and driven members from a normal positional relationship when force transmission from said first driver member to said driven member is taking place.]

[3. The device of claim 1, in which said conditioning means comprises a neutralizing unit acting directly between said second driver and driven members to resist relative rotation thereof from a normal positional relationship when force transmission from said first driver member to said driven member is taking place, said neutralizing unit restoring the second driver member and driven member to said normal relationship upon cessation of transmission of driving force from the former to the latter and resumption of force transmission from the first driver member to the driven-member.]

4. The device of claim *18* [1], in which there are a pair of force transmitting elements positioned relative to said first driver member and said driven member in a manner to transmit force therebetween in either rotative direction, and a pair of said operating elements adapted to actuate the respective force transmitting elements in the manner described, said [conditioning] *positioning* means comprising a neutralizing unit acting to resist relative rotation of said second driver and driven members from a normal positional relationship when force transmission from said first driver member to said driven member is taking place.

5. The device of claim *18*, [1] in which there are a pair of force transmitting elements positioned relative to said first driver member and said driven member in a manner to transmit force therebetween in either rotative direction, and a pair of said operating elements adapted to actuate the respective force transmitting elements in the manner described, said [conditioning] *positioning* means comprising a resilient neutralizing unit acting directly between said second driver and driven members to resist relative rotation thereof from a normal positional relationship when force transmission from said first driver member to said driven member is taking place, said neutralizing unit restoring the second driver member and driven member to said normal relationship upon cessation of transmission of driving force from the former to the latter and resumption of force transmission from the first driver member to the driven member.

[6. The device of claim 2, in which said neutralizing unit exercises a relative rotation-resisting force between said second driver member and said driven member which is at least equal to the frictional resistance of said second driver member to movement from said normal positional relationship to said driven member.]

7. The device of claim 5, in which said resilient neutralizing unit exercises a relative rotation-resisting force between said second driver member and said driven member which is at least equal to the frictional resistance of said second driver member to movement from said normal positional relationship to said driven member.

8. The device of claim 4, in which said operating elements are fixedly connected to said second driver member.

9. The device of claim 4, in which said force-transmitting elements are sprags disposed between said operating elements.

10. The device of claim 4, in which said operating elements are fixedly connected to said second driver member, said force-transmitting elements being sprags disposed between said operating elements.

11. The device of claim *18*, [1] in which said first driver member, second driver member and driven member are internested in axial overlapping relation to one another at recess and projecting formations thereof to afford a very compact construction.

[12. The device of claim 4, in which said first driver member, second driver member and driven member are internested in axial overlapping relation to one another at recess and projecting formations thereof to afford a very compact construction.]

[13. The device of claim 8, in which said second driver member has manually operable means to actuate said operating elements and, through the latter, also said force transmitting elements.]

[14. The device of claim 8, in which said second driver member has manually operable means to actuate said operating elements and, through the latter, also said force transmitting elements, one of said driver members being nested axially within said driven member and the other of said driver members being nested axially within said one driver member.]

[15. The device of claim 4, in which said force transmitting elements act between said first driver member and said driven member to releasably transmit normal force from the former to the latter, said operating elements being drivingly connected to said second driver member and acting in opposite directions on the respective force transmitting elements to interrupt force transmission from said first driver member to said driven member.]

[16. The device of claim 5, in which said force transmitting elements act between said first driver member and said driven member to releasably transmit normal force from the former to the latter, said operating elements being drivingly connected to said second driver member and acting in opposite directions on the respective force transmitting elements to interrupt force transmission from said first driver member to said driven member and then to transmit force through said transmitting elements from the second driver member to the driven member.]

[17. In a clutch of the type described, a first rotatable driver member, a second rotatable driver member, and a rotatable driven member, said members having means providing a rotative drive of the driven member in either rotatie direction selectively from one or the other of said driver members, said means comprising an operating element on one of said driver members, and a force transmitting element adapted to transmit force frictionally from the other of said driver members to said driven member, said operating element acting under the control of said one of said driver members to interrupt transmission of force from said other driver member through said force-transmitting element to the driven member, said means then transmitting driving force from said one driver member to said driven member independently of said other driver member, said first and second driver members and said driven member being in close coaxial and axially nested side-by-side relation to one another.]

*18. In a device of the type described, optionally operated provisions, a first rotatable driver member, a second rotatable driver member, and a rotatable driven member, said members being optionally operated by said provisions to afford a rotative drive of the driven member selectively from one or the other of said driver members, said optionally operating provisions comprising an operating element operatively connected to said second driver member, a force transmitting element adapted to be actuated by said operating element, said force transmitting element being disposed to transmit force between said first driver member and said driven member, and being actuable by said operating element to interrupt force transmission to said driven member from said first driver member and enable the former to be drivingly rotated by said second driver member, said optionally operating provisions also including means to transmit rotative driving force from said second driver member to said driven member, and a control device operatively connected between said second driver member and said driven member and acting automatically to position said operating element in a spaced relation to said force transmitting element for a resumed transmission of force between said first driver member and said driven member upon termination of transmission of driving force to the latter from said second driver member, said operating and force transmitting elements, as so spaced automatically by said control device, having operating clearance relative to one another.*

*19. The device of claim 18, in which said positioning means comprises a neutralizing unit acting to resist relative rotation of said second driver and driven members from a normal positional relationship when force transmission from said first driver member to said driven member is taking place, said neutralizing unit acting resiliently in reference to said operating element in so resisting said relative rotation from said normal positional relationship.*

*20. The device of claim 19, in which said neutralizing unit acts resiliently in reference to said operating element in so resisting said relative rotation from said normal positional relationship.*

*21. The device of claim 18, in which the respective operating and force transmitting elements are slightly*

*spaced from one another in the direction in which the operating element actuates the force transmitting element.*

*22. The device of claim 18, and further comprising means normally urging said force transmitting element in a manner to effect said force transmission.*

*23. The device of claim 4, and further comprising means normally urging said force transmitting element in a manner to effect said force transmission.*

*24. The device of claim 18, in which said last named means acts resiliently in reference to said operating element in so positioning the latter in said neutral relation to said force transmitting element.*

*25. In a device of the type described, optionally operated provisions, a first rotatable driver member, a second rotatable driver member, and a rotatable driven member, said members being optionally operated by said provisions to afford a rotative drive of the driven member selectively from one or the other of said driver members, said optionally operating provisions comprising operating means connected to said second driver member, a pair of force-transmitting elements adapted to be actuated by said operating means, said force transmitting elements being disposed to transmit force between said first driver member and said driven member, and being actuable by said operating means to interrupt force transmission to said driven member from said first driver member and enable the driven member to be drivingly rotated by said second driver member, said optionally operating provisions also including means to transmit rotative driving force from said second driver member to said driven member, and a control device operatively connected between said second driver member and said driven member and acting automatically to position said operating means in a neutral and spaced relation to both said force transmitting elements for a resumed transmission of force between said first driver member and said driven member upon termination of transmission of driving force to the latter from said second driver member, said operating means, as so spaced automatically neutrally by said control device, having operating clearance relative to the force transmitting elements.*

*26. The device of claim 25, in which said positioning means comprises a neutralizing unit acting to resist relative rotation of said second driver and driven members from a normal positional relationship when force transmission from said first driver member to said driven member is taking place, said neutralizing unit acting resiliently in reference to said operating means in so resisting said relative rotation from said normal positional relationship.*

*27. The device of claim 26, in which said operating means and the respective force transmitting elements are slightly spaced from one another in the direction in which the operating means actuates said elements.*

References Cited

The following references, cited by the Examiner, are of record in the patented file of this patent or the original patent.

UNITED STATES PATENTS

| | | | |
|---|---|---|---|
| 2,365,877 | 12/1944 | Horstmann | 192—44 |
| 2,394,384 | 2/1946 | Horstmann | 74—625 |
| 2,509,541 | 5/1950 | Suska | 192—8 |
| 2,881,635 | 4/1949 | Greene | 74—480 |
| 3,102,618 | 9/1963 | Lund | 192—8 |
| 3,243,023 | 3/1966 | Boyden | 192—8 |

BENJAMIN W. WYCHE III, *Primary Examiner.*

U.S. Cl. X.R.

192—8, 43.1, 45.1